(12) United States Patent
Lin

(10) Patent No.: US 7,013,164 B2
(45) Date of Patent: Mar. 14, 2006

(54) FM TRANSMITTER AND CHARGER ASSEMBLY FOR MP3 PLAYERS WITH DIFFERENT SIZES

(75) Inventor: Chung-Hung Lin, Tainan (TW)

(73) Assignee: Jow Tong Technology Co., Ltd., Tainan Hsien (TW)

( * ) Notice: Subject to any disclaimer, the term of this patent is extended or adjusted under 35 U.S.C. 154(b) by 160 days.

(21) Appl. No.: 10/807,109

(22) Filed: Mar. 24, 2004

(65) Prior Publication Data

US 2005/0215285 A1   Sep. 29, 2005

(51) Int. Cl.
*H04B 1/38*   (2006.01)

(52) U.S. Cl. ......................... 455/557; 455/42
(58) Field of Classification Search ............ 455/575.1, 455/575.9, 128, 557

See application file for complete search history.

(56) References Cited

U.S. PATENT DOCUMENTS

2004/0058649 A1 *  3/2004  Grady ........................ 455/42

* cited by examiner

*Primary Examiner*—Nick Corsaro
*Assistant Examiner*—Emem Ekong
(74) *Attorney, Agent, or Firm*—Rosenberg, Klein & Lee

(57) ABSTRACT

A FM transmitter and charger assembly includes a primary member, a FM transmitting device, and a securing member; audio signals in a MP3 player can be transferred to, and transmitted by the transmitting device when both the MP3 player and the FM transmitting device are connected to the primary member while a radio can receive the signals, and play music accordingly when it is tuned to the same channel as the transmitting device; the securing member includes a hollow part for the MP3 player to be closely inserted therein, and an engaging plate connected to a back of the hollow part and capable of being detachably fitted onto the primary member; thus, a certain primary member allows different MP3 players to be securely connected thereto with the help of various securing members, which have different sizes for suiting MP3 players with different sizes.

8 Claims, 5 Drawing Sheets

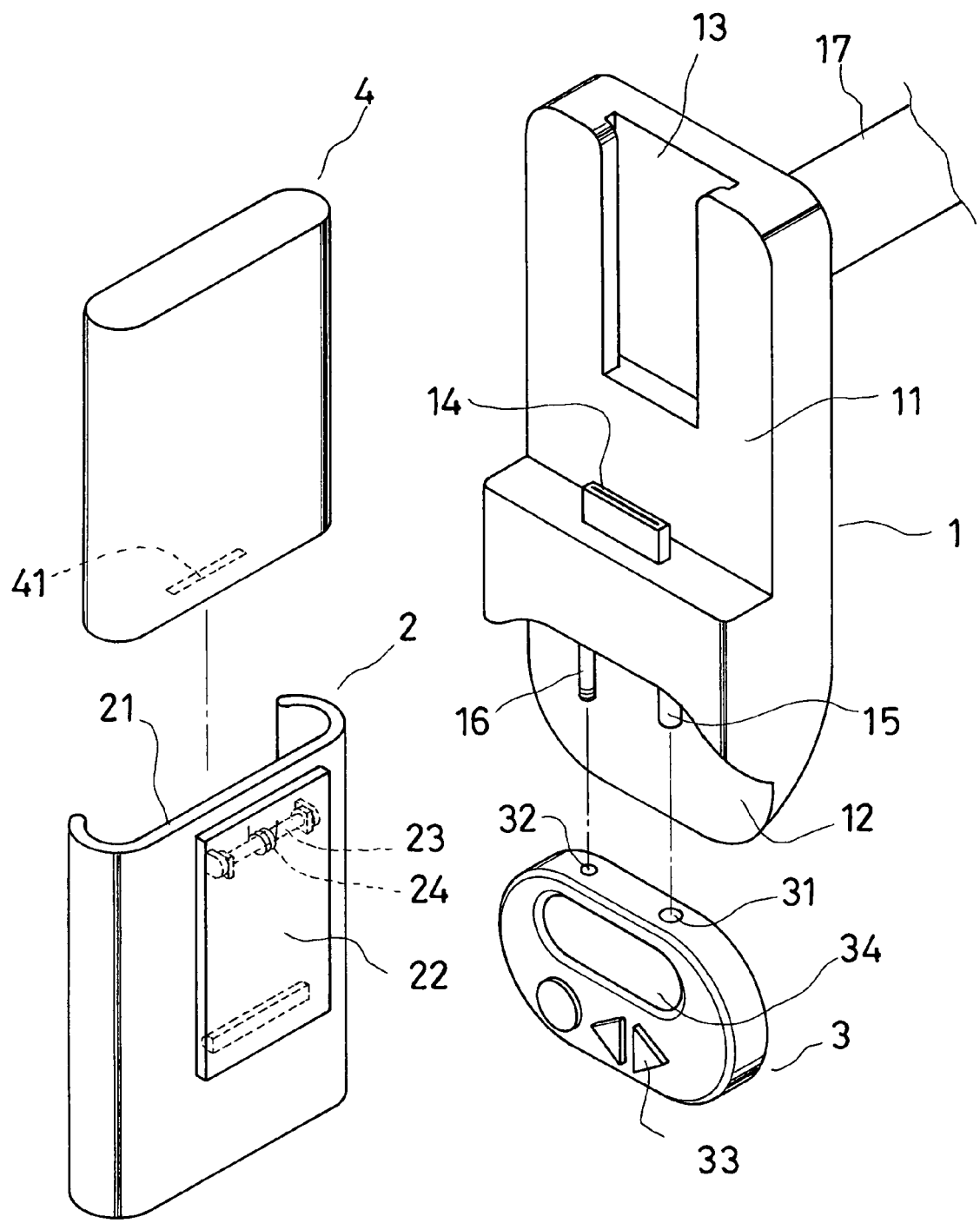
F I G. 1

FM TRANSMITTER AND CHARGER ASSEMBLY FOR MP3 PLAYERS WITH DIFFERENT SIZES

BACKGROUND OF THE INVENTION

1. Field of the Invention

The present invention relates to a FM transmitter and charger assembly for a MP3 player, which is made such that audio signals in a MP3 player can be transferred to, and transmitted by it when the MP3 player is connected to it, allowing a radio to receive and play the audio signals, more particularly one, which includes a primary member, and a securing member for a MP3 player to be closely held therein as well as for securing the MP3 player to the primary member with so that MP3 players with different sizes can be secured to the primary member with the help of respective securing members that suits them in size.

2. Brief Description of the Prior Art

MP3 playing devices include specialized MP3 players, and personal digital assistants (PDA), which can process and store MP3 music data.

Music, which is played by means of MP3 players, and PDA, is usually listened to through earphones. However, many people are not used to wearing earphones.

Therefore, FM transmitters for MP3 player are developed, e.g. one disclosed in U.S. Pat. No. 6,591,085B1 FM Transmitter And Power Supply/Charging Assembly For MP3 Player, which is made such that when a MP3 player is connected to a body thereof, audio signals will be transferred from the MP3 player to the FM transmitter, processed, and wirelessly transmitted by the FM transmitter at a certain frequency. Thus, the audio signals will be received by and played through a FM receiver when the FM receiver is tuned to the same channel as the FM transmitter. Therefore, besides using earphones, people can listen to MP3 music with the help of a FM receiver.

However, the above FM transmitter only allows MP3 players with a particular size to be connected thereto. In other words, the above FM transmitter can only be used together with MP3 players with a particular size. Consequently, use of the FM transmitter is limited.

SUMMARY OF THE INVENTION

It is a main object of the present invention to provide a FM transmitter and charger assembly for a MP3 player, which allows MP3 players with various sizes to be connected thereto.

The FM transmitter and charger assembly of the present invention includes a primary member, a FM transmitting device, and a securing member; audio signals in a MP3 player can be transferred to, and wirelessly transmitted by the transmitting device when both the MP3 player and the FM transmitting device are connected to the primary member. Therefore, the audio signals can be played through a radio, which is tuned to the same channel as the transmitting member. The securing member includes a hollow part for the MP3 player to be closely inserted therein, and an engaging plate connected to a rear side of the hollow part and capable of being detachably fitted into a fitting trench of the primary member; thus, various securing members with different sizes can be provided for suiting different MP3 players, and in turns, a certain primary member allows different MP3 players to be securely connected thereto with the help of suitable securing members.

BRIEF DESCRIPTION OF THE DRAWINGS

The present invention will be better understood by referring to the accompanying drawings, wherein:

FIG. 1 is an exploded perspective front view of the FM transmitter and charger assembly for MP3 player in the present invention.

DETAILED DESCRIPTION OF THE PREFERRED EMBODIMENTS

Figure 2:
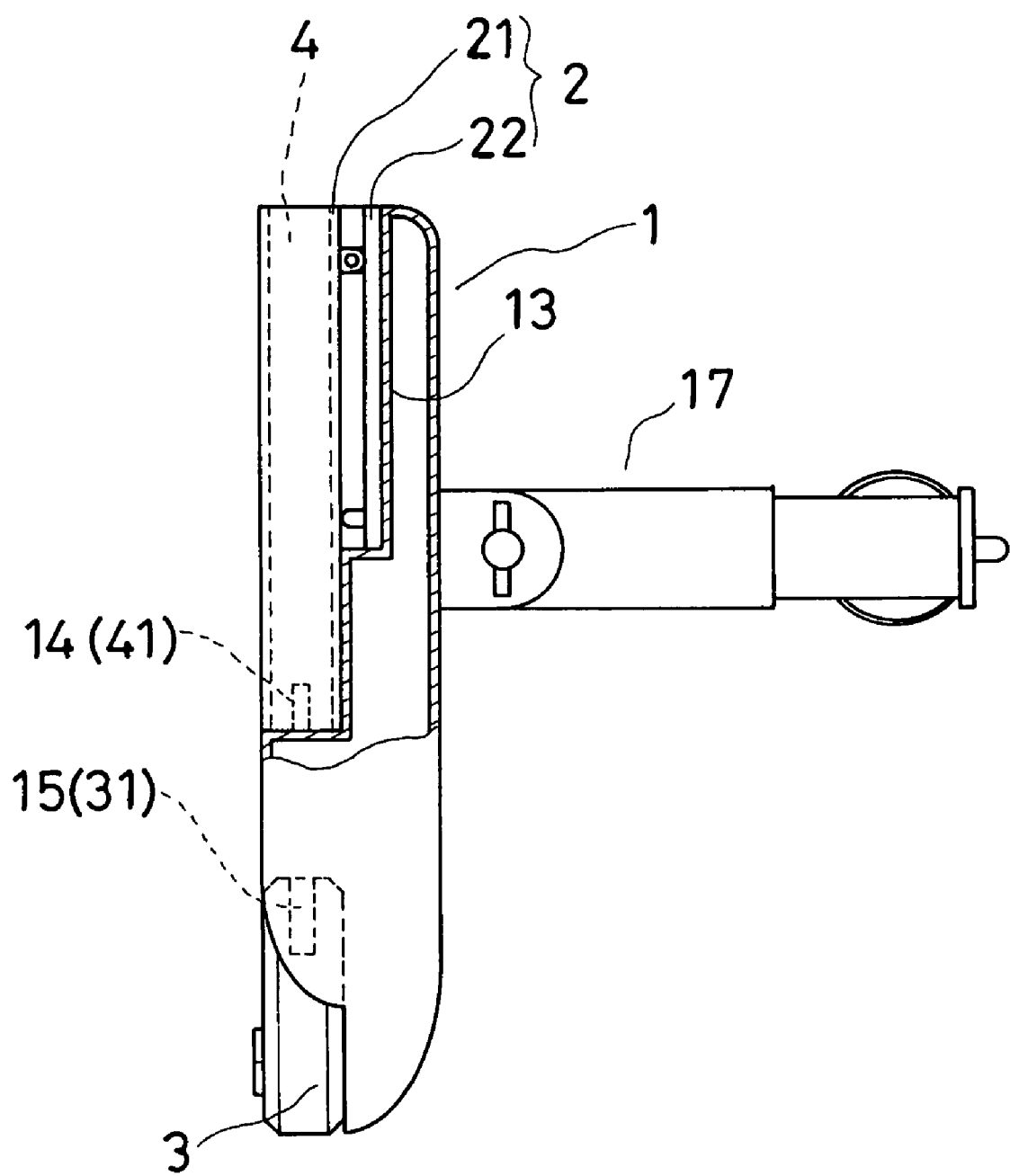
FIG. 2 is a side view of the assembly of the present invention.

Referring to FIGS. 1 to 4, a first embodiment of a FM transmitter and charger assembly for a MP3 player in the present invention includes a primary member 1, a securing member 2, and a FM transmitting device 3.

The primary member 1 has a first locating portion 11 on an upper portion of a front thereof, a second locating portion 12 on a lower portion of the front, a fitting trench 13 on the front side of the first locating portion 11, a connecting unit 14 secured on the first locating portion 11, a power plug 15 and an audio source plug 16 secured on the second locating portion 12, and a power plug 17 secured on a rear side thereof for connection to a power socket of a car. The power plug 17 is electrically connected to both the connecting unit 14 and the power plug 15.

The securing member 2 includes a hollow holding part 21 for a MP3 playing device 4 to be closely inserted therein, and an engaging plate 22 connected to a rear side of the holding part 21 for connection to the fitting trench 13 of the primary member 1, which MP3 playing device 4 can be a specialized MP3 player or a personal digital assistant (PDA), which can store and process MP3 music data; securing members with various sizes can be provided for suiting different MP3 playing devices. To connect the MP3 playing device 4 to the primary member 1, first, the MP3 playing device 4 is held in the holding part 21 of the securing member 2, and then the securing member 2 is fitted to the first locating portion 11 with the engaging plate 22 being fitted into the fitting trench 13, and with a socket 41 of the MP3 playing device 4 being connected to the connecting unit 14 of the primary member 1.

The FM transmitting device 3 includes a power socket 31, an audio source socket 32, a digital FM transmitting circuit (not shown) inside, several operation buttons 33, and a display 34. The FM transmitting device 3 is detachably fitted to the second locating portion 12 of the primary member 1 with the power socket 31, and the audio source socket 32 being respectively connected to the power plug 15, and the audio source plug 16; the operation buttons 33 are used for setting operational mode, function, and transmission frequency of the FM transmitting device 3 while the display 34 is used for showing the operational mode, the function, and the transmission frequency.

Thus, after both the FM transmitting device 3 and a MP3 playing device are connected to the primary member 1, and after the power plug 17 of the primary member 1 is connected to a power socket of a car, power will be supplied to the FM transmitting device 3 through the power plugs 17 and 15, and to the MP3 playing device through the power plug 17 and the connecting unit 14, and audio signals will be transferred from the MP3 playing device to the FM transmitting device 3 through both the connecting unit 14 and the audio source plug 16 as soon as the FM transmitting device 3 is turned on. And, the FM transmitting device 3 will transmit the audio signals at a certain frequency as set by means of the operation buttons 33. Consequently, a common radio will receive the audio signals, and play music accordingly after it is tuned to the same channel as the FM transmitting device 3.

A MP3 playing device will be charged when the MP3 playing device is connected to the primary member 1 plus the power plug 17 of the primary member 1 is connected to a power socket of a car; the FM transmitting device 3 won't be needed, and can be removed from the primary member 1 when the MP3 playing device is being charged.

Figure 3:
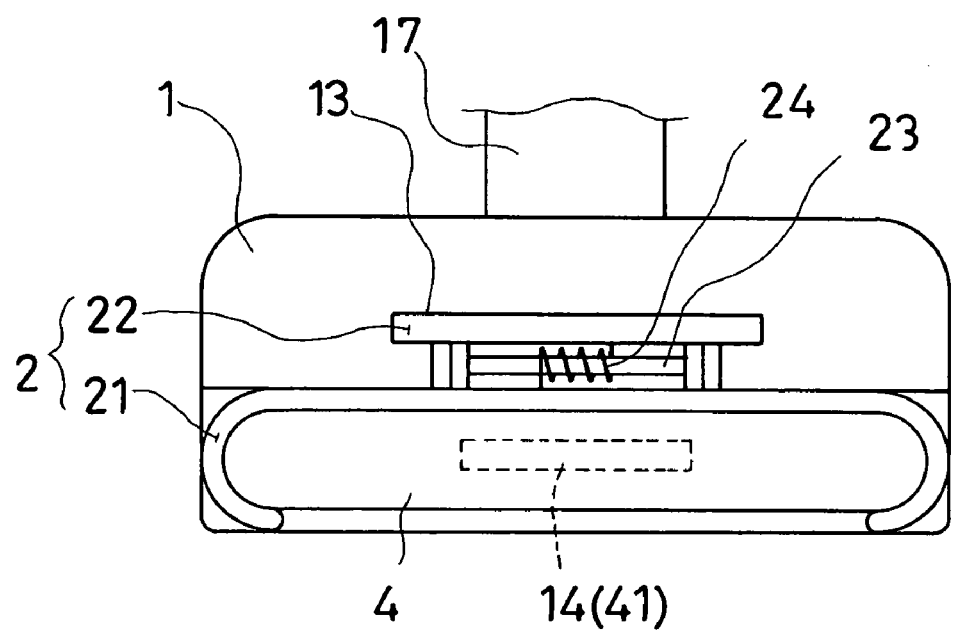
FIG. 3 is a top view of the assembly of the present invention.
Figure 4:
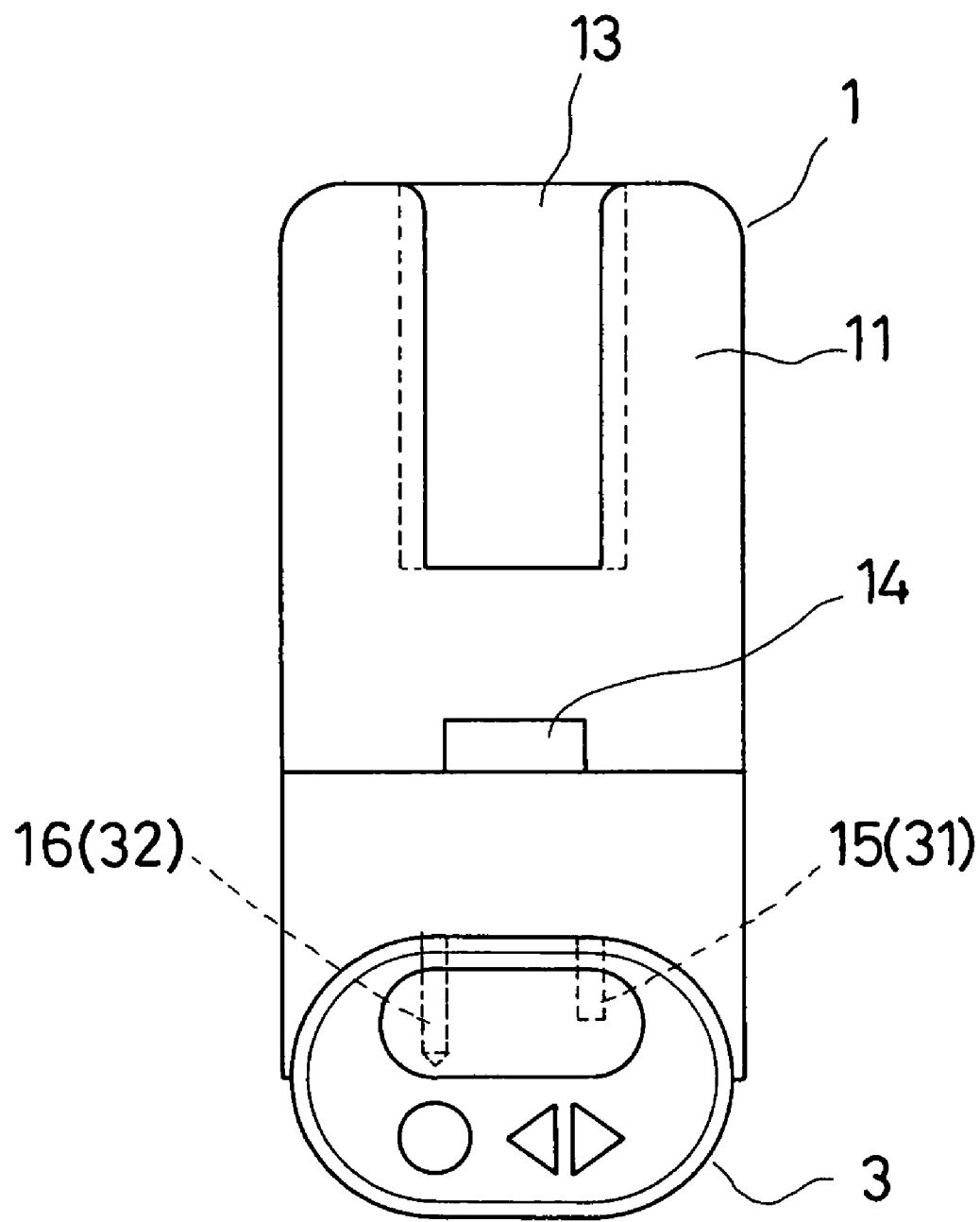
FIG. 4 is a front view of the primary member of the assembly of the present invention, with the FM transmitter fitted thereto.

Referring to FIGS. 1 and 3, in the first embodiment, the hollow holding part 21 of the securing member 2 is made of hard materials, and formed in such a way as to have a substantially C-shaped horizontal cross-section. And, a pivotal rod 23 is supported on the rear side of the holding part 21, and connected to the engaging plate 22 while a spring 24 is connected to the pivotal rod 23 and pressed against both the holding part 21 and the engaging plate 22 at two ends; thus, the engaging plate 22 can be angularly displaced relative to the holding part 21, and is biased close to the holding part 21 by the spring 24. Thus, after the securing member 2 is separated from the primary member 1, the securing member 2 can be hung on a belt with the belt being sandwiched between the holding part 21 and the engaging plate 22, and a MP3 playing device can be carried in the securing member 1.

Figure 6:
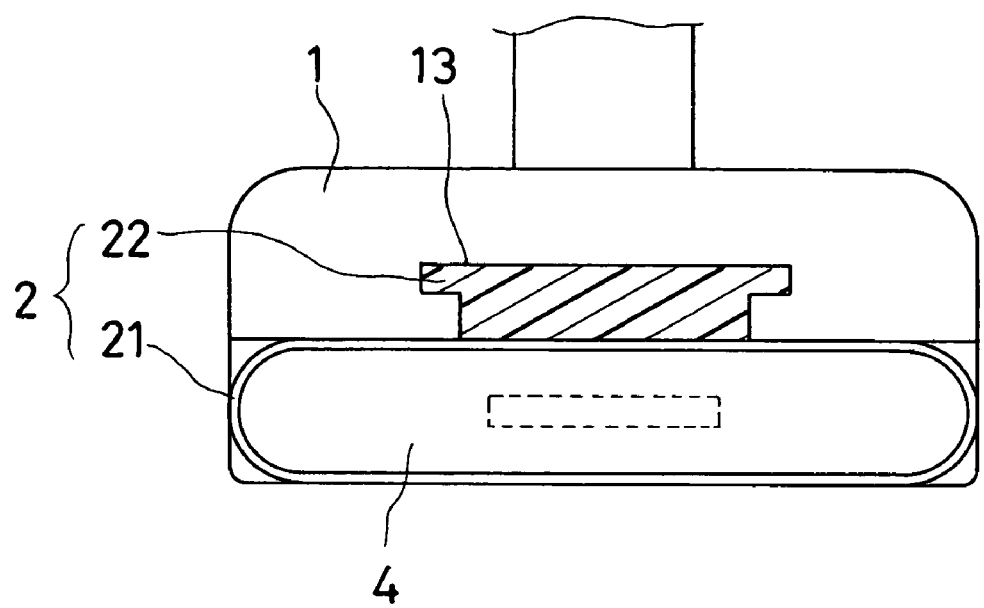
FIG. 6 is a top view of the second embodiment in the present invention.
Figure 5:
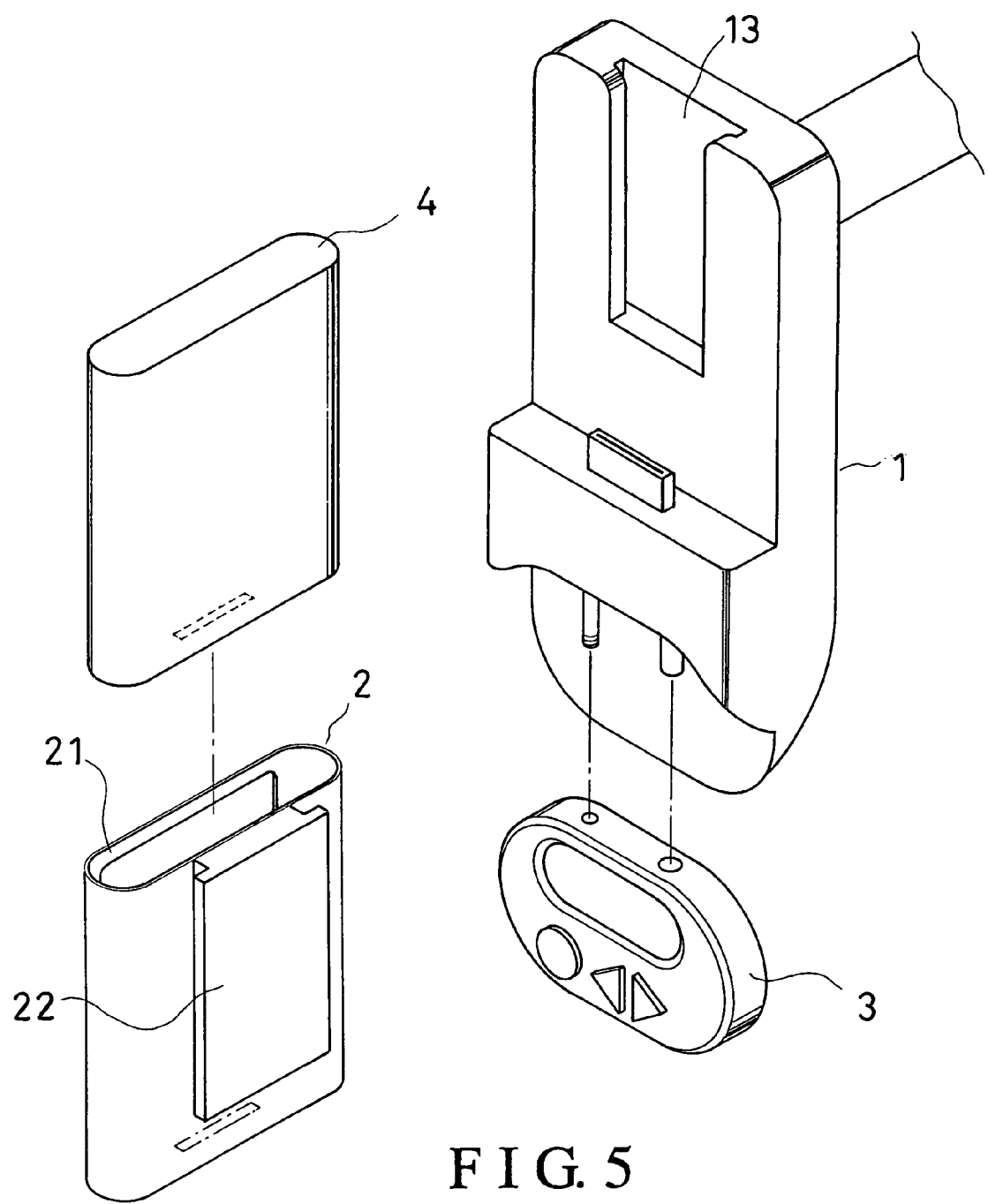
FIG. 5 is an exploded perspective front view of the second embodiment in the present invention.

Referring to FIGS. 5 and 6, in a second embodiment, hollow holding part 21 of securing member 2 is made of soft materials, e.g. leather, and rubber, and substantially in the shape of a bag. And, engaging plate 22 can be fixed on the rear side of the above holding part 21, as shown in FIGS. 5 and 6, or connected to the holding part 21 in the way of the first embodiment, as shown in FIGS. 1 and 3.

From the above description, it can be easily understood that the FM transmitter and charger assembly for MP3 player in the present invention has the following advantages:

1. Audio signals can be transferred from a MP3 player to the FM transmitting device 3, and wirelessly transmitted by the transmitting device 3 after the MP3 player and the transmitting device 3 are connected to the primary member 1, which audio signals will be received by, and played through a FM radio and loudspeakers of a car when the radio is tuned to same channel as the transmitting device.
2. The primary member 1 can be used together with securing members 2 with different sizes therefore different MP3 playing devices can be connected to the primary member 1 with the help of respective suitable securing members 2 although the MP3 playing devices have different sizes. In other words, the present FM transmitter and charger assembly is suitable for various MP3 playing devices.
3. Power of a car can be supplied to a MP3 playing device for activating the same through the power plug 17 of the primary member 1 and a power socket of the car.
4. Power of a car can be supplied to a MP3 playing device to charge the same through the power plug 17 of the primary member 1 and a power socket of the car; the FM transmitting device 3 doesn't have to be connected to the primary member 1 in charging the MP3 playing device.
5. Power of a car can be supplied to the FM transmitting device 3 for activating the same through the power plug 17 of the primary member 1 and a power socket of the car.

What is claimed is:

1. A FM transmitter and charger assembly for a MP3 player, comprising a primary member having a first locating portion on a front thereof for supporting a MP3 player thereon; the first locating portion being formed with a fitting trench on a front side thereof; the primary member having a second locating portion on the front; the first locating portion having a connecting unit secured thereon for connection to a socket of a MP3 player when the MP3 player is located on the first locating portion; the second locating portion having a first power plug and an audio source plug secured thereon; the primary member having a second power plug secured on a rear thereof and electrically connected to both the first power plug and the connecting unit; the connecting unit being electrically connected to the audio source plug;

a securing member for holding a MP3 player therein as well as for securing the MP3 player to the first locating portion of the primary member; the securing member including:

(1) a hollow holding part for the MP3 player to be closely inserted therein;

(2) an engaging plate connected to a rear side of the hollow part and capable of being detachably fitted into the fitting trench of the primary member;

a FM transmitting device detachably connected to the second locating portion of the primary member; the transmitting device having a power socket, and an audio source socket for connection to the first power plug, and the audio source plug of the primary member respectively; the FM transmitting device being made so as to be capable of transmitting audio signals wirelessly, which are transferred thereto from a MP3 player connected to the connecting unit of the primary member, thus allowing a radio to receive the audio signals, and play music accordingly after the radio is tuned to a same channel as the FM transmitting device;

whereby a MP3 player can be secured to the primary member when the engaging plate of the securing member is fitted into the fitting trench of the primary member after the MP3 player has been closely inserted in the hollow part of the securing member.

2. The FM transmitter and charger assembly for a MP3 player as claimed in claim 1, wherein the FM transmitting device has a plurality of operation buttons usable for setting an operational mode, function, and transmission frequency, and a display for showing operational mode, function, and transmission frequency thereon.

3. The FM transmitter and charger assembly for a MP3 player as claimed in claimed 1, wherein the hollow holding part of the securing member is made of hard materials, and formed in such a way as to have a substantially C-shaped horizontal cross-section.

4. The FM transmitter and charger assembly for a MP3 player as claimed in claimed 1, wherein the hollow holding part of the securing member is made of soft materials, and substantially in the shape of a bag.

5. The FM transmitter and charger assembly for a MP3 player as claimed in claimed 1, wherein the securing member has a pivotal rod, and a spring connected to both the hollow part and the engaging plate thereof such that the engaging plate is biased close to, and angularly displaceable relative to the hollow part.

6. The FM transmitter and charger assembly for a MP3 player as claimed in claimed 1, wherein a MP3 player will be charged when it is connected to the primary member plus the second power plug of the primary member is connected to a power socket of a car; the FM transmitting device needing not to be connected to the primary member when a MP3 player is being charged.

7. The FM transmitter and charger assembly for a MP3 player as claimed in claimed 1, wherein the MP3 player is a specialized MP3 player.

8. The FM transmitter and charger assembly for a MP3 player as claimed in claimed 1, wherein the MP3 player is a personal digital assistant (PDA), which can store and process MP3 music data.

* * * * *